(12) United States Patent
Larghi

(10) Patent No.: US 6,973,070 B1
(45) Date of Patent: Dec. 6, 2005

(54) SYSTEM AND METHOD FOR TRANSMITTING SUBSCRIBER DATA IN A NARROWBAND ADVANCED MESSAGING SYSTEM USING UNSCHEDULED MESSAGE TIME SLOTS

(75) Inventor: Stephen Larghi, Keller, TX (US)

(73) Assignee: WebLink Wireless, Inc., Dallas, TX (US)

( * ) Notice: Subject to any disclaimer, the term of this patent is extended or adjusted under 35 U.S.C. 154(b) by 0 days.

(21) Appl. No.: 09/388,255

(22) Filed: Sep. 1, 1999

Related U.S. Application Data
(60) Provisional application No. 60/098,873, filed on Sep. 1, 1998.

(51) Int. Cl.[7] ................................................. H04J 3/12
(52) U.S. Cl. ........................................ 370/348; 370/346
(58) Field of Search ................................ 370/340, 347, 370/348, 328, 329, 310, 311, 313, 314, 315, 343, 341, 342; 455/343; 340/7.37, 7.21

(56) References Cited

U.S. PATENT DOCUMENTS

| | | | | |
|---|---|---|---|---|
| 5,883,886 A | * | 3/1999 | Eaton | 370/314 |
| 5,960,327 A | * | 9/1999 | Eaton | 455/38.3 |
| 6,084,866 A | * | 7/2000 | Dorerbosch | 370/331 |

* cited by examiner

Primary Examiner—Douglas Olms
Assistant Examiner—Ricardo M. Pizarro (57) ABSTRACT

There is disclosed for use in a narrowband wireless messaging network, a subscriber communication unit that uses a miscellaneous ALOHA message to transmit predefined messages and/or formatted telemetry data to a base station. The subscriber communication unit comprises a transceiver for receiving messages from the base station in a forward channel and transmitting messages to the base station in a reverse channel. The reverse channel is divided into a plurality of scheduled transmission time slots and a plurality of unscheduled transmission time slots of the ALOHA type. A message controller receives input data generated by the subscriber communication unit and translates the input data into a reverse channel message capable of being transmitted in an available unscheduled time slot, such as a miscellaneous ALOHA message time slot.

20 Claims, 5 Drawing Sheets

SYSTEM AND METHOD FOR TRANSMITTING SUBSCRIBER DATA IN A NARROWBAND ADVANCED MESSAGING SYSTEM USING UNSCHEDULED MESSAGE TIME SLOTS

CROSS-REFERENCE TO RELATED APPLICATIONS

The present invention is related to those disclosed in the following United States Patent Applications:

1. Ser. No. 09/002,191, filed Dec. 31, 1997, entitled "ANTENNA SYSTEM FOR NARROWBAND COMMUNICATIONS SYSTEMS AND METHOD OF OPERATION";
2. Ser. No. 09/001,717, filed Dec. 31, 1997, entitled "CONTROLLER FOR: USE WITH COMMUNICATIONS SYSTEMS FOR CONVERTING A VOICE MESSAGE TO A TEXT MESSAGE";
3. Ser. No. 09/001,759, filed Dec. 31, 1997, entitled "SYSTEM FOR SCHEDULING REVERSE-CHANNEL MESSAGES IN NARROWBAND COMMUNICATIONS SYSTEMS AND METHODS OF OPERATION";
4. Ser. No. 09/138,438, filed Aug. 21, 1998, entitled "SYSTEM AND METHOD FOR MODELING SIMULCAST DELAY SPREAD AND OPTIMIZING LAUNCH DELAYS";
5. Provisional Serial No. 60/098,873, filed Sep. 1, 1998, entitled "NARROWBAND TELEMETRY SYSTEM AND METHODS OF OPERATION";
6. Ser. No. 09/387,480, filed concurrently herewith, entitled "SYSTEM AND METHOD FOR CONTROLLING AN END-USER APPLICATION AMONG A PLURALITY OF COMMUNICATION UNITS IN A WIRELESS MESSAGING NETWORK";
7. Ser. No. 09/337,470, filed concurrently herewith, entitled "SYSTEM AND METHOD FOR CONTROLLING TRANSMITTER POWER OF A NARROWBAND ADVANCED MESSAGING SYSTEM"; and
8. Ser. No. 09/387,463, filed concurrently herewith, entitled "SYSTEM AND METHOD FOR OVER-THE-AIR REPROGRAMMING OF AN ADVANCED WIRELESS MESSAGING DEVICE."

The above applications are commonly assigned to the assignee of the present invention. The disclosures of these related patent applications are hereby incorporated by reference for all purposes as if fully set forth herein.

TECHNICAL FIELD OF THE INVENTION

The present invention is directed, in general, to wireless communication systems and methods of operating the same and, in particular, to systems and methods for transmitting messages in a narrowband wireless messaging network.

BACKGROUND OF THE INVENTION

The demand for better and cheaper wireless communication services and equipment continues to grow at a rapid pace. Much of this growth is spurred by the Federal Communication Commission's ("FCC") approval of certain frequency bands for the next generation of Personal Communication Service ("PCS") devices that provide advanced voice. and/or data messaging services, as well as voice telephone services. A relatively small portion of the available frequency bands was set aside for log narrowband PCS ("NPCS") to encourage efficient use of the available spectrum. There are a number of well-known wireless communication techniques that attempt to maximize the efficiency with which the available spectrum is used. These methods include frequency division multiple access ("FDMA"), time division multiple access ("TDMA"), code division multiple access ("CDMA"), and the like. The term "multiple access" means that multiple subscribers (or , users) are able to communicate simultaneously with each of these systems.

In general, the infrastructure of a messaging system is somewhat different than cellular telephone systems. For instance, in a NPCS messaging system, all of the base station transmitters throughout a wide coverage area are synchronized and simultaneously broadcast (i.e., simulcast) a message in a forward-channel to a subscriber's wireless communication unit (e.g., portable message pagers, fixed messaging or telemetry devices, etc.). This simulcast increases the likelihood that the transmitted message will reach the device even through obstacles, such as buildings, trees, overpasses, and the like. Likewise, the subscriber communication units are capable of transmitting messages in a reverse-channel to numerous receivers associated with base stations. However, the messaging system does not assign the subscriber to a particular cell and does not transmit to the subscriber only in one cell, as in the case of a cellular telephone system.

Telemetry systems, broadly stated, are communication systems that transmit "status" information from a remote process, function, or device (collectively, "telemetry application") to a central control facility. Telemetry systems may be used in lieu of maintenance workers to remotely monitor a given telemetry application, such as a utility meter, security system, vehicle locator, environmental monitor, vending machine, medical equipment, oil drilling equipment, and the like.

Two-way wireless messaging systems are frequently implemented using a reverse channel that is divided into a number of scheduled transmission time slots and a number of unscheduled transmission time slots (known as ALOHA slots). A subscriber communication unit, such as a telemetry device or a two-way pager, uses an unscheduled ALOHA message to request and/or schedule the transmission of a data message to a wireless network base station using one of more of the subsequent scheduled message time slots. The use of the ALOHA messages allows the subscriber communication unit to initiate the transmission of data to the wireless network when a scheduled time slot has not previously been allocated. After a scheduled transmission slot is allocated, the subscriber communication unit transmits the corresponding data in the reverse channel during the scheduled time slot. However, this is a highly structured communication protocol that uses a considerable amount of the available bandwidth. In a narrowband wireless messaging system, particularly a telemetry system, it is crucial that bandwidth be conserved. There is a premium on using the available bandwidth as efficiently as possible.

Therefore, there exists a need in the art for an improved wireless messaging network that minimizes the bandwidth needed to transmit data from a subscriber communication unit to a base station. In particular, there is a need for an improved wireless message protocol that allows a subscriber communication unit, such as a telemetry device, to transmit messages to a base station in a narrowband PCS environment with a minimum amount of protocol overhead.

SUMMARY OF THE INVENTION

To address the above-discussed deficiencies of the prior art, it is a primary object of the present invention to provide, for use in a narrowband wireless messaging network, a subscriber communication unit comprising: 1) a transceiver capable of receiving messages from a base station in a forward channel and transmitting messages to the base station in a reverse channel, wherein the reverse channel is divided into a plurality of scheduled transmission time slots and a plurality of unscheduled transmission time slots of the ALOHA type; and 2) a message controller capable of receiving input data generated by the subscriber communication unit and translating the input data into a reverse channel message capable of being transmitted in an available one of the unscheduled time slots.

In one embodiment of the present invention, the reverse channel message is a miscellaneous ALOHA message.

In another embodiment of the present invention, the message controller translates the input data into one of N predefined messages.

In still another embodiment of the present invention, the input data is generated by a subscriber using manual controls to select the one of N predefined messages.

In yet another embodiment of the present invention, the N predefined messages are stored in a look-up table (LUT) associated with the message controller.

In a further embodiment of the present invention, the N predefined messages are modifiable by the subscriber.

In a still further embodiment of the present invention, the data comprises measured data received from monitored equipment associated with the subscriber communication unit and message controller translates at least one of the measured data into the reverse channel message.

In a yet further embodiment of the present invention, the message controller assigns the measured data into one or more data fields in the reverse channel message The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily. use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means:any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DESCRIPTION OF THE INVENTION

FIGS. 1 through 5, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless messaging network.

Figure 1:
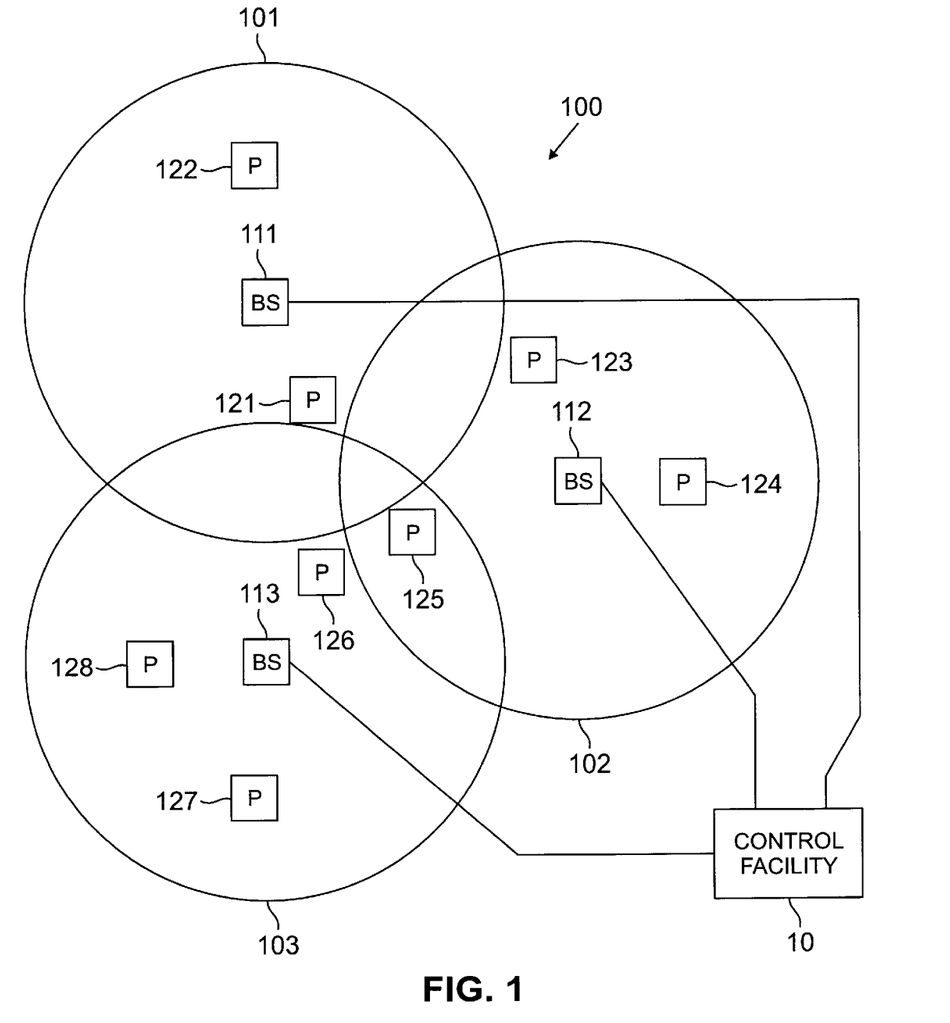
FIG. 1 illustrates a representative portion of an exemplary messaging network in accordance with one embodiment of the present invention.

Turning initially to FIG. 1, there is illustrated a representative portion of a conventional messaging network (generally designated "100" and referred to below as "network 100"). Network 100 provides two-way data messages to subscribers. (or users) of network 100. Network 100 is represented by three exemplary fixed land sites, called base stations, which communicate with a plurality of subscriber communication units 121–128 (e.g., message pagers, telemetry devices, PCS devices, personal data assistants, or other processing systems that include wireless communication capability, etc.) within network 100.

Base stations 111, 112 and 113, each labeled "BS" in FIG. 1, have coverage areas 101, 102, and 103, respectively, that are determined by the power of the transmitters in base stations 111, 112, and 113. For the purposes of illustration and discussion, coverage areas 101, 102, and 103 are shown as circles. In real world environments, however, each of coverage areas 101, 102, and 103 may differ significantly from an idealized circular form.

For purposes of illustration, a plurality of subscriber communication units, each labeled "P" in FIG. 1, are shown scattered throughout messaging network 100. Subscriber communication units 121 and 122 are located within coverage area 101 and may engage in two-way messaging with base station 111. Subscriber communication units 123 and 124 are located in coverage area 102 and may engage in two-way messaging with base station 112. Subscriber communication units 126, 127 and 128 are located in coverage area 103 and may engage in two-way messaging with base station 113. Subscriber communication unit 125 is located in coverage areas 102 and 103 and may engage in two-way messaging with base stations 112 and 113.

In a NPCS environment, base stations 111, 112, and 113 transmit signals in a forward-channel, such as from 939–940 MHZ, for example. Base stations 111, 112, and 113 receive signals in a reverse-channel at, for example, 901–902 MHZ. Each base station is effectively a transceiver that contains a transmitter and a receiver for carrying out two-way communications. Each subscriber communication unit receives forward-channel messages directed to it at a selected frequency within the forward-channel. Each communication also transmits reverse-channel messages at a selected frequency within the reverse-channel.

Messaging network 100 may be, for example, a two-way wireless messaging system compatible with the MOTOROLA®, ReFLEX™ transport protocol. The ReFLEX™ protocol may be used to send a message to a subscriber communication unit. The subscriber communication unit may then transmit in the reverse-channel an automatic acknowledgment message that does not require subscriber action. Alternatively, the ReFLEX™ protocol may be used in an enhanced messaging mode to send a more complex message to the subscriber communication unit. The subscriber communication unit may then transmit in the reverse-channel an automatic acknowledgment message that does not require subscriber action. Some time later, the subscriber may transmit a "canned" message stored in the subscriber communication unit, such as "Will Call You Later", or a unique message composed by the subscriber using a keypad on the subscriber communication unit.

Base station 111 transmits messages to subscriber communication units in coverage area 101. Base station 112 transmits messages to subscriber communication units in coverage area 102. Base station 113 transmits messages to subscriber communication units in coverage area 103. Base stations 111, 112, and 113 may be associated with one another and to a control facility 10 by a wired backbone, such as a proprietary fiber-optic network. In alternate embodiments, base stations 111, 112, and 113 may be associated with one another and to control facility 10 by a satellite communications link, such as through a very small aperture terminal ("VSAT").

It should be noted that while the illustrated embodiment discloses centralized control facility 10 for controlling communication among the exemplary subscriber communication units, in alternate advantageous embodiments communications control may be distributed. It should also be noted that messages may be received into control facility 10 from a variety of sources. Some messages may be received from a public telephone system in the form of simple call-back numbers entered by a caller on a DTMF keypad. Other messages may be received by control facility 10 from an Internet connection. Additionally, and most importantly in the context of the present invention, messages may be received from subscriber communication units, such as telemetry devices in the field.

Figure 2:
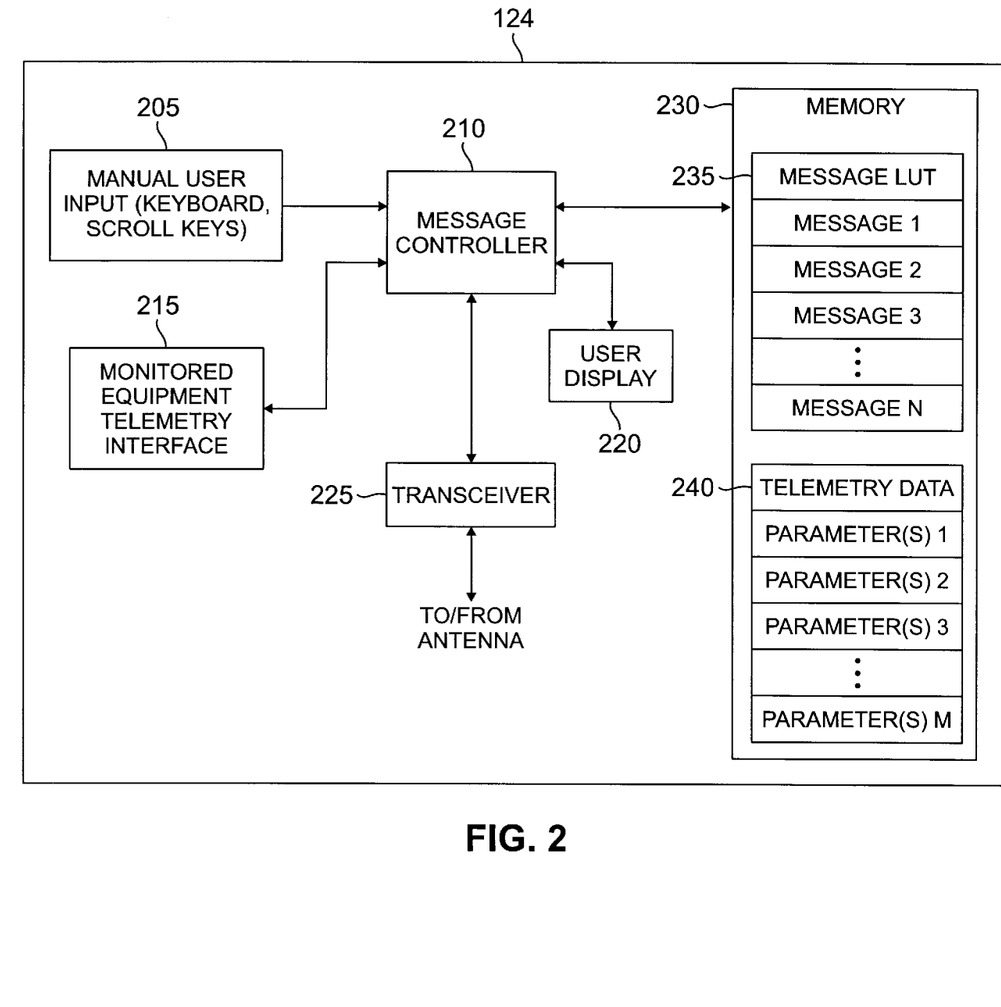
FIG. 2 illustrates a block diagram of an exemplary subscriber communication unit for use in the network in FIG. 1 in accordance with one embodiment of the present invention.

Turning to FIG. 2, there is illustrated a block diagram of an exemplary one of subscriber communication units 121–128 for use in network 100. Exemplary subscriber communication unit 124 may be a two-way paging device used by a subscriber or may be a part of a telemetry device that is used to transmit to network 100 measured. data, status messages, alarm messages, and the like, from monitored equipment. owned by a subscriber. The monitored equipment may comprise a vending machine, medical equipment, a home alarm system, remote oil field equipment, remote power generation equipment, and the like, and subscriber communication unit 124 may be external to, or intergrated into, the monitored equipment.

Exemplary subscriber communication unit (SCU) 124 comprises manual user input device 205, message controller 210, monitored equipment telemetry interface 215, user display 220, transceiver 225, and memory 230. Manual user input device 205 comprises means for subscriber selection and entry of data to SCU 124. Input means range from a limited, selected group of entry devices, such as dedicated push-buttons, through an alphanumeric keyboard with a full range of function keys, such as scroll, tab, etc.

Message controller 210 accepts inputs from manual user input device 205 and transfers data to/from other elements of SCU 124, as shown. Message controller 210 also controls the execution of standard wireless messaging functions between network 100 and SCU 124, as well as improving utilization of available bandwidth through transmission of data in unscheduled message time slots in accordance with. the principles of the present invention.

Monitored equipment telemetry interface 215 accepts telemetry data from monitored equipment and transfers this data to message controller 210 for processing and subsequent transfer to external components of communication network 100, such as base station 112 and control facility 10. Monitored equipment telemetry interface 215 may also accept inputs from message controller 210 for the control of status displays associated with the monitored equipment or as required for coordinating the transfer of telemetry monitoring information.

User display 220 displays data processed by message controller 220, including but not limited to, incoming network data, manually entered or selected data, applicable telemetry data, etc. In one embodiment, user display 220 may comprise a more extensive alphanumeric display for display of longer length incoming and locally generated predefined status messages and telemetry messages.

Transceiver 215 receives forward channel messages from, and transmits reverse channels messages to, network 100 through base station 112 and control facility 10. Transceiver 215 dow-nconverts the received forward channel messages and transfers them to message controller 210. Transceiver 215 also receives the reverse channel messages from message controller 210 and up-converts them to RF signals for transmission to base station 112.

Memory 120 provides storage for data received from message controller 210. In one embodiment, memory 120 may temporarily store keyboard data which provides capability for scrolling through the content of stored predefined messages, a coded index or pointer to a predefined out-going message, keyboard or other manually generated inputs which represent data to be directly output to network 100, telemetry data from monitored equipment telemetry interface, and the like. Memory 120 may also provide non-volatile memory for storage of keyboard or other manually entered data for use in configuration of SCU 124 and for storage of predefined look-up table (LUT) messages. and associated pointers for output to network 100, and the like.

In one embodiment, memory 230 is partitioned into areas for storage of specific information. For example, message lookup table (LUT) 235 provides storage for predefined messages, labeled Message 1–Message N. Each of Message 1–Message N comprises a predefined text field that is displayed to the subscriber and a corresponding translated message field consisting of, for example, 11 bits or less that is inserted in, the miscellaneous ALOHA field and transmitted to base station 112. Telemetry data table 240 provides storage for various telemetry parameters, labeled Parameter 1–Parameter M, received from monitored equipment telemetry interface 215. The parameters include alarm messages, status messages, measured data, and the like. Message controller 210 may translate individual parameters into 11-bit (or less) ALOHA messages, or may combine two or more parameters into 11-bit (or less) ALOHA messages.

If SCU 124 is, for example, a two-way pager or other manually operated wireless messaging device, message controller 210 receives manually generated inputs for sequential display of the predefined messages stored in message LUT 235. In response, message controller 210 transfers the first predefined messages to user display 220 for viewing by the subscriber. Message controller 210 subsequently monitors manual user input 205 for indications of a request to display the next predefined message or to transmit the presently displayed predefined message to base station 112. In response to user commands from manual user input 205, message controller 210 continues to sequentially display predefined messages from message LUT 235 until one is selected or the user quits. When a predefined message is finally selected, message controller 210 translates the. selected predefined message into an ALOHA message, as described below for transmission to base station 112 in an unscheduled message time slot (i.e., ALOHA miscellaneous time slot) through transceiver 225.

In a telemetry application, message controller 210 receives telemetry data from monitored equipment telemetry interface 215 or retrieves telemetry previously stored in memory 230 and translates this data into required parameter format for output to network 10 in one or more unscheduled message time slots. For instance, message controller 210, in conjunction with telemetry data 240 and transceiver 225, may transfer one or more telemetry parameters in one or more 11-bit ALOHA miscellaneous time slots.

Figure 3A:
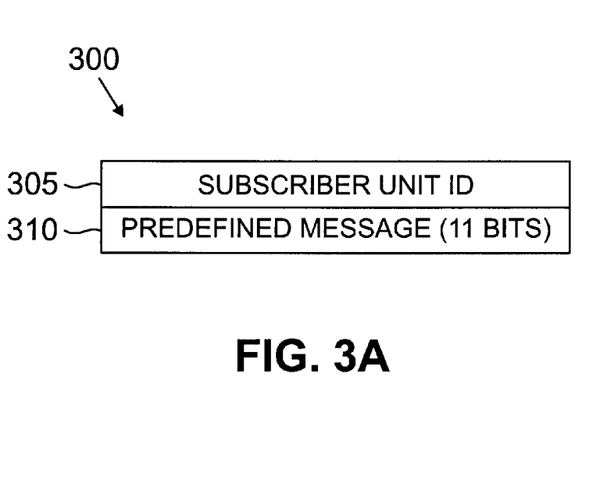
FIGS. 3A and 3B illustrate exemplary formats for pre-defined and telemetry defined 11-bit messages in accordance with one embodiment of the present invention.
Figure 3B:
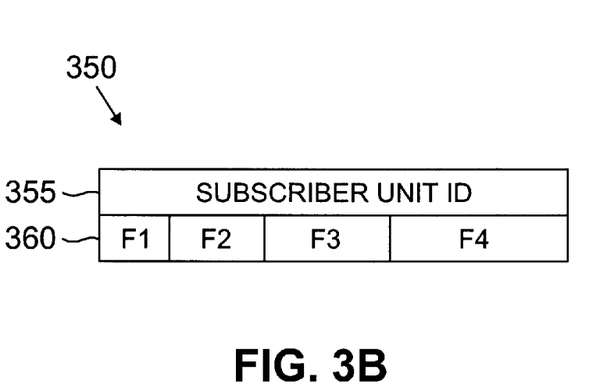

FIGS. 3A and 3B provide high level illustrations of exemplary reverse channel messages for transfer of subscriber communication unit identification codes (subscriber unit IDs) plus a predefined message or telemetry data in unscheduled miscellaneous ALOHA time, slots. Predefined message 300 comprises subscriber unit ID 305 and, for example, an 11-bit (or less) predefined message 310. The subscriber unit ID 305 comprises a standard field for identification of subscriber communication unit 124 and may also include a destination field if SCU 124 is capable of sending messages to a plurality of destinations, rather that to a dedicated end-user device.

Exemplary predefined message 310 is an 11-bit (or less) message which is transferred in the unscheduled miscellaneous ALOHA time slot associated with the reverse channel transmission of subscriber unit ID 305. In one embodiment, predefined message 310 comprises an 11-bit code which serves as a pointer or index to a specific predefined message, such code being entered directly or as an abbreviation through a manual input device or through scrolling and selection means, as previously described. In another embodiment, predefined message 310 may comprise 11-bits of data which directly represent the data to be transferred and displayed, without the use of translation processes, such data again being entered through keyboard or other manual input device. Predefined messages may be the same throughout the network, may be specifically defined by associated groups of subscribers, may be uniquely defined by two communicating subscribers, or combinations of these configurations.

When predefined message 310 represents a pointer, control facility 10 and/or a destination end-user device uses the pointer to identify a location in an associated message look-up table (LUT), with the associated table location providing the original alphanumeric or similar predefined message for transfer to the associated user display. In one exemplary embodiment, predefined message 310 may be in the form of a binary code, serving as a pointer to one of a maximum 2048 distinct predefined messages.

As an example, "meet me" and "call me" may be predefined messages with set binary codes which are common throughout network 100. "The house alarm is ON" may be a message created by a group of associated subscribers, such as family members, for the purpose of alerting them to an emergency situation. In one embodiment, message LUT may be partitioned to accommodate a group of network-wide common, personal, and/or telemetry predefined messages.

In a telemetry application, telemetry message 350 comprises subscriber unit ID 355 and, for example, an 11-bit (or less) telemetry data field that are transmitted in unscheduled "miscellaneous" ALOHA message time slot. A subscriber communication unit may be associated with specific telemetry device(s) and a single destination device which is to receive the same telemetry message. For this embodiment, subscriber unit ID 355 may only comprise the address of SCU 124, a destination address is not needed. Control facility 10 recognizes that subscriber unit ID 355 corresponds to SCU 124 and forwards the telemetry message to a unique end-user monitoring station associated with SCU 124. For example, if SCU 124 is part of a home alarm system, control facility may transfer the telemetry data to the alarming monitoring service providers network.

Exemplary 11-bit telemetry message 360 may be partitioned into a plurality of sub-fields, such as four variously sized segments, labeled as F1 through F4. The code associated with each segment of exemplary message 360 may directly convey particular telemetry information. For example, F1 may indicate that an alarm is ON, F2 may indicate that gas pressure is too high, too low, or acceptable, F3 may indicate that temperature is within tolerance or is out-of-tolerance, and F4 may indicate a quantity of cup cakes in a vending machine.

Figure 4:
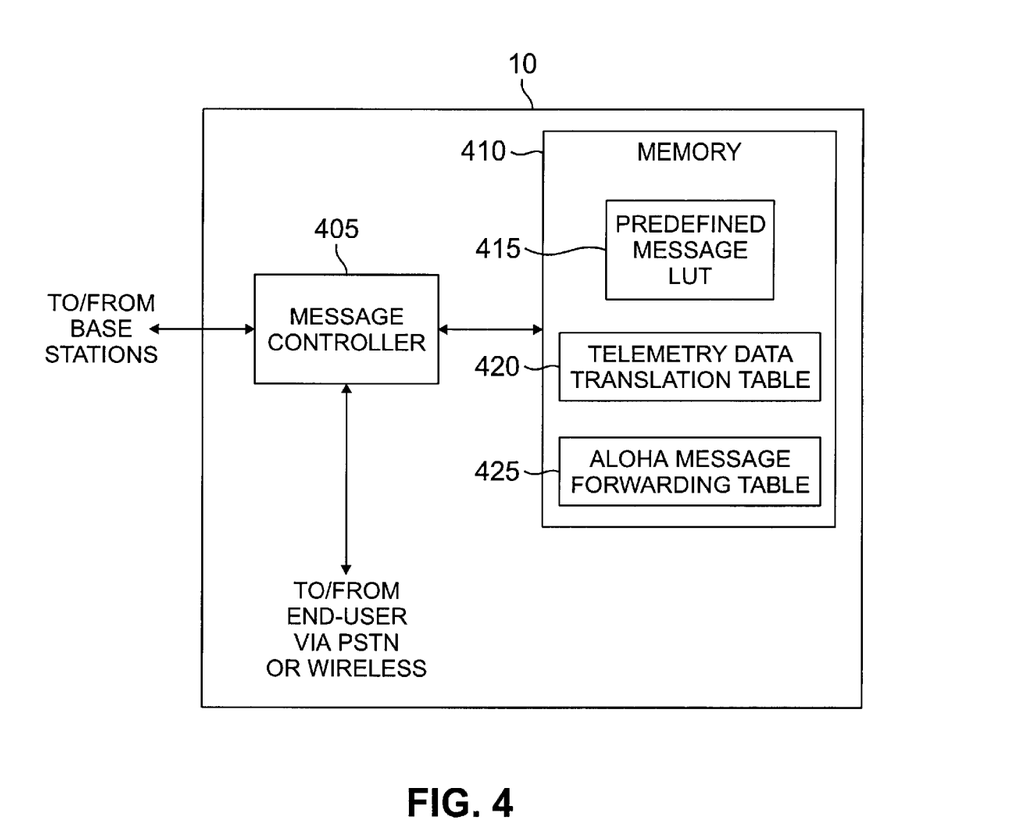
FIG. 4 illustrates a portion of an exemplary control facility for use in the network in FIG. 1 in accordance with one embodiment of the present invention.

FIG. 4 is a block diagram of exemplary control facility 10. Control facility 10 comprises message controller 405 and memory 410, which stores predefined message look-up table (LUT) 415, telemetry data translation table 420, and ALOHA message forwarding table 425. Message controller 405 transfers data to and from subscriber communication units via the base stations. Message controller 405 may also comprise means for exchanging data with end users and end-user devices through the publicly switched telephone network (PSTN) or through another wireless communication network.

Message controller 405 transfers incoming data to temporary storage in memory 410 and further interfaces with segments of memory circuit 410 to obtain appropriate destination addresses for identified subscriber communication units. In another embodiment, message controller 405 may also interface with memory 410 to obtain required conversion information for ALOHA-based predefined and telemetry messages.

Exemplary message controller 405 receives ALOHA messages from base stations and converts these messages, as required, for subsequent output to the identified subscriber communication units through interfacing base stations or to the end-user through PSTN or other wireless means. In one embodiment, message controller 405 treats received subscriber unit ID, such as 300 or 355, as a pointer to its associated destination subscriber communication unit addresses for network 10 or for its PSTN or other wireless destination address.

Message controller 405 identifies the content of the selected ALOHA-based predefined message by using predefined message 310 content as a pointer to an associated text message in predefined message LUT 415. Subsequently, message controller 405 causes the predefined message .text from predefined message LUT 415 to be transferred to the destination device, such as a recipient message pager, a network server, a PC, a fax machine, or the like.

In a telemetry application, message controller 405 may directly transfer the received ALOHA telemetry message to the designated end-user for subsequent translation and display, or it may treat segments of the ALOHA telemetry text 360 as pointers to the telemetry data translation table 420. In the latter case, message controller 405 may cause the identified telemetry data to be transferred to the designated destination(s).

Figure 5:
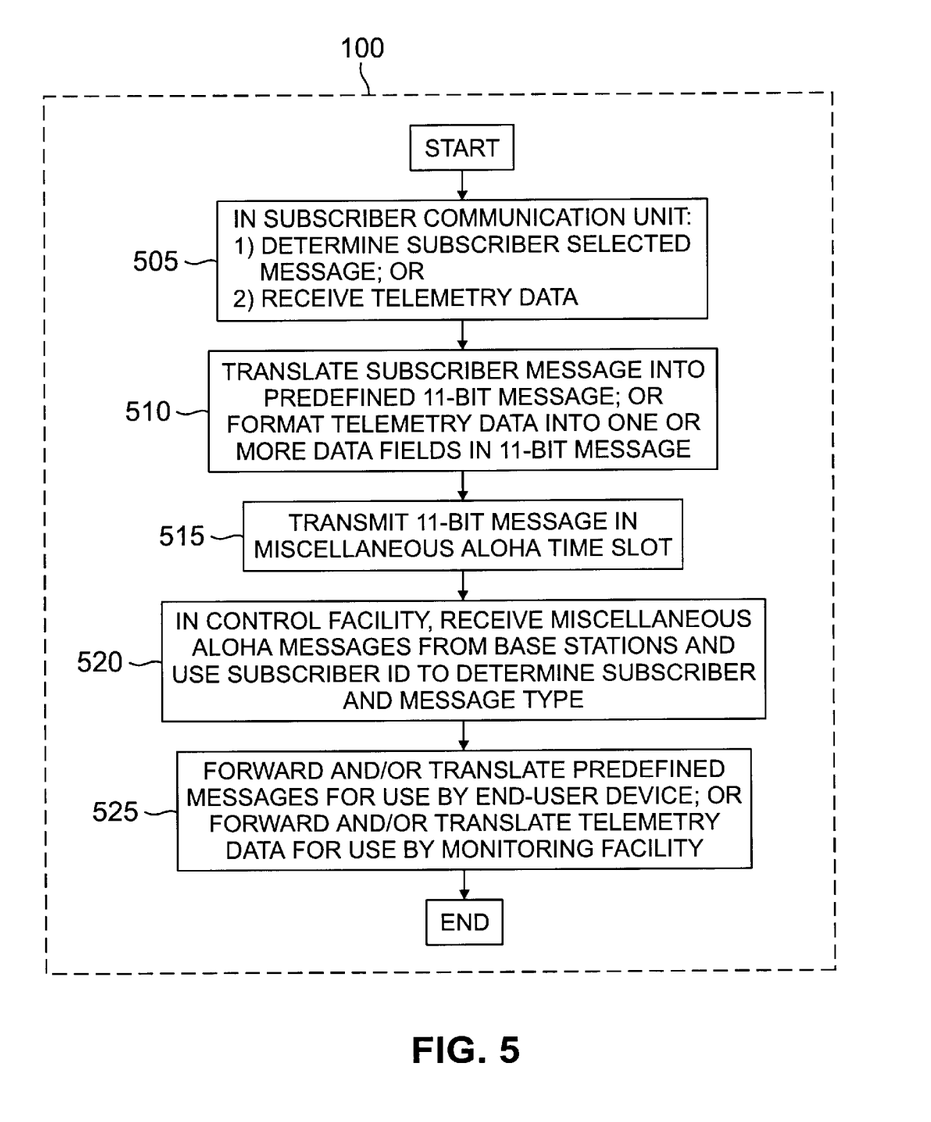
FIG. 5 illustrates a flow diagram for an exemplary messaging network in accordance with one embodiment of the present invention.

FIG. 5 is a flow diagram of an exemplary process by which exemplary network 100 uses unscheduled ALOHA message time slots for the transfer of subscriber data. SCU 124 determines whether a subscriber has selected a message for output or if data has been received from an associated telemetry interface (process step 505). Depending upon the type of selected message, SCU 124 may translate the subscriber generatedor selected message from manual user input device 205 to a predefined 11-bit message or it may translate the received telemetry data into one or more various length data fields or a pointer to specific telemetry parameter(s) for output as one or more 11-bit messages (process. step 510). Once the desired message has been formatted, SCU 124 transmits its subscriber. unit ID, possibly including a destination address field, and the 11-bit miscellaneous ALOHA message (process step 515).

Subsequently, control facility 10 receives subscriber unit ID and miscellaneous ALOHA message from a receiving base station and temporarily stores these messages. Control facility 10 identifies the end-user destination and the message type from the received subscriber unit ID field. Control facility 10 uses the subscriber unit ID to determine if the message type is a predefined message or telemetry data (process step 520).

When a predefined message is identified, control facility 10 translates and/or forwards the predefined message text to the designated subscriber communication unit or other end-user device for display. When a telemetry, message is identified, control facility 10 translates and/or forwards the telemetry message to the designated telemetry monitoring facility (process step 525).

Those of ordinary skill in the art should appreciate that they can readily use the disclosed conception and specific embodiments as a basis for designing or modifying other structures for carrying out the same purposes of the present invention. Those of ordinary skill in the art should also realize that such equivalent constructions do not depart from the spirit and scope of the present invention in its broadest form.

What is claimed is:

1. For use in a narrowband wireless messaging network, a subscriber commnmuniation unit comprising:

a transceiver capable of receiving messages from a base station in a forward channel and transmitting messages to said base station in a reverse channel, wherein said reverse channel is divided into a plurality of scheduled transmission time slots and a plurality of unscheduled transmission time slots of the ALOHA type; and a message controller capable of receiving input data generated by said subscriber communication unit and translating said input data into a predefined message associated with said subscriber communication unit and inserting said predefined message into a reverse channel message capable of being transmitted in an available one of said unscheduled time slots, wherein said input data comprises measured data received from monitored equipment associated with said subscriber communication unit and said message controller translates at least one of said measured data into said reverse channel message.

2. A narrowband wireless messaging network comprising:

a plurality of base stations capable of transmitting messages in a forward channel to, and receiving messages in a reverse channel from, a plurality of subscriber communication units, wherein said reverse channel is divided into a plurality of scheduled transmission time slots and a plurality of unscheduled transmission time slots of the ALOHA type; and a message controller capable of receiving an incoming message including predefined messages associated with subscriber communication units in one of said unscheduled transmission time slots from one of said plurality of base stations and translating data contained in said incoming message into at least one of: 1) one of N predefined messages; and 2) measured data received from monitored equipment associated with at least one of said plurality of unscheduled transmission time slots, wherein message controller determines if said incoming message is one of: 1) said one of N predefined messages; and 2) said measured data according to a subscriber communication ID data associated with said incoming message.

3. For use in a narrowband wireless messaging network comprising a plurality of base stations capable of transmitting messages in a forward channel to, and receiving messages in a reverse channel from, a plurality of subscriber communication units, wherein the reverse channel is divided into a plurality of scheduled transmission time slots and a plurality of unscheduled transmission time slots of the ALOHA type, a method of communicating subscriber data from a first subscriber communication unit comprising the steps of:

receiving input data generated by the subscriber communication unit; and translating the input data into a predefined message associated with the subscriber communication unit and inserting said predefined message into a reverse channel message capable of being transmitted in an available one of the unscheduled time slots, wherein the input data comprises measured data received from monitored equipment and the step of translating translates at least one of the measured data into the reverse channel message.

4. The subscriber communication unit set forth in claim 1 wherein said message controller translates said input data into one of N predefined messages.

5. The subscriber communication unit set forth in claim 4 wherein said input data is generated by a subscriber using manual controls to select said one of N predefined messages.

6. The subscriber communication unit set forth in claim 4 wherein said N predefined messages are stored in a look-up table (LUT) associated with said message controller.

7. The subscriber communication unit set forth in claim 6 wherein said N predefined messages are modifiable by said subscriber.

8. The subscriber communication unit set forth in claim 1 wherein said message controller assigns said measured data into one or more data fields in said reverse channel message.

9. The narrowband wireless messaging network set forth in claim 2 wherein said incoming message is a miscellaneous ALOHA message.

10. The narrowband wireless messaging network set forth in claim 2 wherein said one of N predefined messages is selected by a subscriber using manual controls associated with one of said plurality of subscriber communication units.

11. The narrowband wireless messaging network set forth in claim 10 wherein said N predefined messages are stored in a look-up able (LUT) associated with said message controller.

12. The narrowband wireless messaging network set forth in claim 11 wherein said N predefined messages are modifiable by sail briber.

13. The narrowband wireless messaging network set forth in claim 2 wherein said measured data is formatted into a plurality of defined fields in said incoming message.

14. The method set forth in claim 3 wherein the reverse channel message is a miscellaneous ALOHA message.

15. The method set forth in claim 3 wherein the step of translating translates the input data into one of N predefined messages.

16. The method set forth in claim 15 wherein the input data is generated by a subscriber selecting the one of N predefined messages.

17. The method set forth in claim 15 wherein the N predefined messages are stored in a look-up table (LUT).

18. The method set forth in claim 17 wherein the N predefined messages are modifiable by the subscriber.

19. The subscriber communication unit set forth in claim 1 wherein said reverse channel message is a miscellaneous ALOHA message.

20. The method set forth in claim 19 wherein the step of translating comprises the step of assigning the measured data into one or more data fields in the reverse channel message.

* * * * *